United States Patent
Ichida

(10) Patent No.: US 8,947,706 B2
(45) Date of Patent: Feb. 3, 2015

(54) INFORMATION PROCESSING SYSTEM AND METHOD, AND NON-TRANSITORY COMPUTER READABLE MEDIUM FOR USING IDENTIFICATION INFORMATION, FOR FIRST AUTHENTICATION TO AN INFORMATION SYSTEM, WITH A PRINT SERVICE SYSTEM THAT PERFORMS SECOND AUTHENTICATION

(75) Inventor: Hajime Ichida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 165 days.

(21) Appl. No.: 13/607,137

(22) Filed: Sep. 7, 2012

(65) Prior Publication Data
US 2013/0242334 A1   Sep. 19, 2013

(30) Foreign Application Priority Data
Mar. 14, 2012   (JP) .................................. 2012-056873

(51) Int. Cl.
G06F 15/00     (2006.01)
G06K 1/00      (2006.01)
G06F 3/12      (2006.01)

(52) U.S. Cl.
USPC ........................... 358/1.15; 358/1.13; 358/1.9

(58) Field of Classification Search
None
See application file for complete search history.

(56) References Cited

U.S. PATENT DOCUMENTS

| 8,760,679 | B2 * | 6/2014 | Watanabe ..................... 358/1.14 |
| 2001/0013948 | A1 * | 8/2001 | Fujiwara et al. ............. 358/1.15 |
| 2003/0014368 | A1 * | 1/2003 | Leurig et al. .................... 705/64 |
| 2006/0044607 | A1 * | 3/2006 | Kato ............................ 358/1.15 |
| 2008/0151286 | A1 * | 6/2008 | Matsuo ........................ 358/1.15 |
| 2008/0244756 | A1 * | 10/2008 | Kitada ............................ 726/28 |
| 2008/0259397 | A1 * | 10/2008 | Uehara ........................ 358/1.15 |
| 2011/0007347 | A1 * | 1/2011 | Kamath et al. ............... 358/1.15 |
| 2013/0024919 | A1 * | 1/2013 | Wetter et al. ...................... 726/6 |
| 2013/0070288 | A1 * | 3/2013 | Muranaka .................... 358/1.15 |
| 2013/0235418 | A1 * | 9/2013 | Tanaka ........................ 358/1.15 |

FOREIGN PATENT DOCUMENTS

JP    10-207661 A    7/1998

* cited by examiner

Primary Examiner — Ming Hon
(74) Attorney, Agent, or Firm — Sughrue Mion, PLLC

(57) ABSTRACT

An information processing system includes a setting unit and an identification information extracting unit. The setting unit obtains first identification information that is identification information of a user in an information system that performs first authentication, the identification information being input by the user for user authentication to an image forming apparatus connected to the information system, sends setting information including the first identification information to a print service system that performs second authentication, thereby establishing a logical printer in which the setting information is set in the service system, and sets, as identification information of a person who uses the logical printer, second identification information that is identification information of the user in the service system. The extracting unit receives, from the service system, print data to be printed by the image forming apparatus, and extracts and outputs the first identification information set in the received print data.

12 Claims, 7 Drawing Sheets

INFORMATION PROCESSING SYSTEM AND METHOD, AND NON-TRANSITORY COMPUTER READABLE MEDIUM FOR USING IDENTIFICATION INFORMATION, FOR FIRST AUTHENTICATION TO AN INFORMATION SYSTEM, WITH A PRINT SERVICE SYSTEM THAT PERFORMS SECOND AUTHENTICATION

CROSS-REFERENCE TO RELATED APPLICATIONS

This application is based on and claims priority under 35 USC 119 from Japanese Patent Application No. 2012-056873 filed Mar. 14, 2012.

BACKGROUND (i) Technical Field

The present invention relates to an information processing system and method, and to a non-transitory computer readable medium.

(ii) Related Art

Existing print services are generally on-premises services installed at individual organizations (such as companies and schools). Because an on-premises print service (server) is a closed system for each organization, user identification information (ID) (such as an employee number) unique to that organization may be used as it is as a user account. Therefore, security printing and aggregation management of print jobs may be easily performed using user IDs unique to each organization.

In contrast, cloud print services provided on the Internet have been proposed in recent years. A user at a personal computer (PC) or the like logs in to a cloud print service with a user ID for that service, and, after the user logs in, the user sends print data to the cloud print service. The print data is printed by providing the print data from the cloud print service to an image forming apparatus via the Internet or the like.

Unlike on-premises services, cloud print services are shared among plural organizations or individuals, and each cloud print service allocates user IDs independent of the individual organizations. Because users may not be able to obtain, as their user IDs for the cloud print services, the same user IDs as those in their organizations, user IDs used for user authentication in the cloud print services do not generally coincide with user IDs that are given in and unique to the individual organizations. A cloud print service knows a user ID for that service with regard to print data, but does not know a user ID unique to each organization. Therefore, when print data is provided from a cloud print service to an image forming apparatus and is printed with the image forming apparatus, because that print data includes no user ID unique to an organization, the image forming apparatus is unable to perform security printing or aggregation management regarding that print data on the basis of the user ID unique to the organization.

In user management in a print service system such as a cloud print service, only user identification information in the print service system is managed. Therefore, if there is any information that may be sent as user identification information of print data from the print service system to an image forming apparatus in a certain organization, that information is the user identification information in the print service system, not in the organization.

SUMMARY

According to an aspect of the invention, there is provided an information processing system including: a setting unit that obtains first identification information that is identification information of a user in an information system that performs first authentication, the identification information being input by the user for user authentication to an image forming apparatus connected to the information system, sends setting information including the obtained first identification information to a print service system that performs second authentication, thereby establishing a logical printer in which the setting information is set in the print service system, and sets, as identification information of a person who uses the logical printer, second identification information that is identification information of the user in the print service system; and an identification information extracting unit that receives, from the print service system, print data to be printed by the image forming apparatus, and extracts and outputs the first identification information set in the received print data.

BRIEF DESCRIPTION OF THE DRAWINGS

An exemplary embodiment of the present invention will be described in detail based on the following figures, wherein.

DETAILED DESCRIPTION

Figure 1:
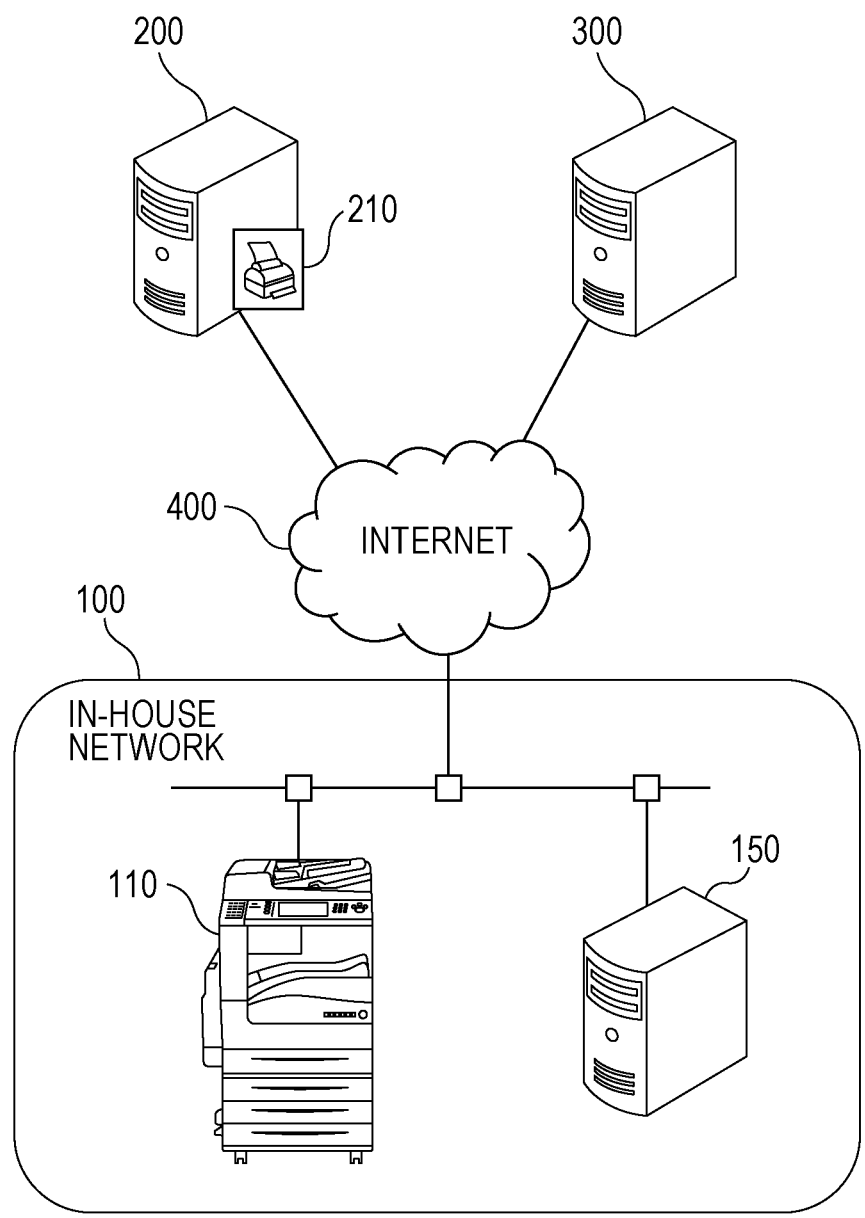
FIG. 1 is a diagram illustrating an example of the configuration of a system according to an exemplary embodiment.

Referring to FIG. 1, an example of the configuration of a system according to an exemplary embodiment will be described. The system described by way of example includes an in-house network 100 in a certain company, a cloud print service 200, and a cloud repository service 300, which are connected to the Internet 400.

The in-house network 100 is configured as, for example, a local area network (LAN). A personal computer (PC), an image forming apparatus 110, an aggregation apparatus 150, and another server are connected to the in-house network 100.

The company described by way of example here is an example of an "organization" including plural users. The PC, the image forming apparatus 110, the aggregation apparatus 150, and the like connected to the in-house network 100 constitute an internal information system in that "organization".

The image forming apparatus 110 is an apparatus that prints, on a sheet, print data input thereto. The image forming apparatus 110 may include functions in addition to a print function. For example, the image forming apparatus 110 may be a so-called digital multifunctional apparatus including, in addition to the print function, a scan function, a copy function, a facsimile sending function, and an email sending function. Although only one image forming apparatus 110 is illustrated in FIG. 1, plural image forming apparatuses 110 may be connected to the in-house network 100. Besides the function of executing a process such as copying, scanning, or printing in response to an instruction from a user, which is accepted by a user interface (UI) unit 112 (see FIG. 2) of the image forming apparatus 110, the image forming apparatus 110 has the function of executing a process such as printing in response to an instruction from a computer in the in-house network 100. Also, the image forming apparatus 110 has the function of obtaining print data from the cloud print service 200 on the Internet 400 and printing and outputting the print data.

Each user (individual in this case) who belongs to the company is allocated a user ID unique in the company (that is, exclusive within the company) (hereinafter referred to as an "in-house ID"). For example, an employee number is an example of such a user ID. The image forming apparatus 110 has the function of performing user authentication using an in-house ID. A user who wants to use the image forming apparatus 110 is asked to present authentication information (such as inputting the in-house ID and password from the UI unit 112, or integrated circuit (IC) card authentication). The image forming apparatus 110 performs user authentication in accordance with the presentation, thereby specifying the in-house ID of that user. The image forming apparatus 110 incorporates the specified in-house ID in log information or the like of an executed process, and records the log information therein or in the aggregation apparatus 150 in the in-house network 100. The recorded log information may be aggregated by the aggregation apparatus 150 for management of the usage of the image forming apparatus 110 or for accounting management. Aggregation is performed for, for example, each user or for each section (department or group in the company) to which the user belongs, on the basis of the in-house ID recorded in each piece of log information.

The cloud print service 200 is a system that provides a print service to a user on a network such as the Internet 400. Although the cloud print service 200 is generally a system including plural computers, the cloud print service 200 may be constituted of a single computer.

The cloud print service 200 provides users with the function of converting, for example, document data (such as document data generated by software such as a word-processing or spreadsheet program) specified by a user to be printed into data in a data format in a page description language that the image forming apparatus 110 is capable of handling (such as Portable Document Format (PDF) or PostScript (registered trademark)), the function of generating a print job corresponding to the accepted print instruction and managing the execution status of that print job (such as queue management), and the like. The cloud print service 200 generates and manages a logical printer 210 (may also be referred to as a "printer object") that realizes various functions for print services. In the logical printer 210, at least one user who uses the logical printer 210 is registered. In general, plural logical printers 210 are held in the cloud print service 200, and each logical printer 210 is used by at least one user who is registered therein.

In addition, at least one physical image forming apparatus 110, which outputs a print job held in a queue in the logical printer 210, may be registered in the logical printer 210. In this case, the logical printer 210 holds management information regarding the registered image forming apparatus 110. The management information includes, for example, identification information (such as a printer name) of the image forming apparatus 110, and capability information that indicates the capability (functions) of the image forming apparatus 110. The capability information includes information indicating, for example, whether the image forming apparatus 110 is capable of performing duplex printing or full-color printing, the sheet sizes held therein, and the like. When the image forming apparatus 110 has a post-processing device, the capability information further includes information regarding the capability of the post-processing device (such as stapling, punching, and folding functions).

The user registers (generates) the user's account in the cloud print service 200. When generating the account, the user registers a user ID (hereinafter referred to as a "cloud ID") that is unique in the cloud print service 200. The cloud print service 200 is a public service, and management of user IDs in the cloud print service 200 is independent of user management in the in-house network 100 of the company. Thus, the cloud ID is generally not the same as the in-house ID. For example, when a user in the company tries to register a user ID including the same character string as that of the in-house ID in the cloud print service 200, the user may not be able to register that user ID because, for example, that user ID has already been allocated to another person.

The cloud print service 200 generates a logical printer 210 in response to an instruction from a user. For each logical printer 210, the cloud print service 200 stores the cloud ID of each user registered as a user who is capable of using that logical printer 210. Alternatively, in response to an instruction to an existing logical printer 210 from a user who has the right to be registered, the cloud print service 200 may register, in the existing logical printer 210, that user as a user who is capable of using the existing logical printer 210.

A user logs in with the user's cloud ID to the cloud print service 200 via the Internet 400 by using a communication protocol such as the Hypertext Transfer Protocol (HTTP) from a PC or a mobile terminal on the Internet 400 (outside the in-house network 100) or from a PC or the image forming apparatus 110 in the in-house network 100, and the user gives a print instruction to a logical printer 210 selected from among one or more logical printers 210 (there may be plural logical printers 210) associated with that cloud ID. The print instruction includes document data to be printed, or information that specifies a target to be printed, such as information that specifies document data to be printed (such as information of the storage location of the document data on the Internet 400 (such as a uniform resource locator (URL))). Here, for example, document data may exist in the cloud repository service 300, which will be described later. In response to the print instruction, the logical printer 210 generates a print job and manages the print job. The print job is a unit for managing the print instruction in the logical printer 210, and the print job is given a unique job ID. In association with the job ID, the logical printer 210 manages information such as information of the document data to be printed, page description language data obtained by converting the document data, the cloud ID of the user who has given the print instruction, and the execution status (such as unexecuted, being executed, execution completed, or error) of the print job.

The logical printer 210 sends the held print job to a printer serving as a physical apparatus at an output destination specified by the user (hereinafter referred to as a "physical printer") and causes the physical printer to print the print job (push method), or, in response to an obtaining request from the physical printer, provides the print job to that physical printer (pull method). For example, since the image forming apparatus 110 in the in-house network 100 is generally behind a firewall, when a print job in the logical printer 210 is to be printed with the image forming apparatus 110, printing is performed using the pull method in which the image forming apparatus 110 accesses the cloud print service 200 using a protocol such as HTTP and obtains the print job.

The cloud repository service 300 is a system that provides users with repository services on the Internet 400. Repository services are services for storing data and programs and are also called "online storage services". Although the cloud repository service 300 is a system that is generally constituted of plural computers, the cloud repository service 300 may be constituted of a single computer.

For each user, the cloud repository service 300 saves various files such as document data and programs uploaded by the user, and provides the saved files to the user. The user obtains a user ID that is unique in the cloud repository service 300 by registering the user in the cloud repository service 300. Using the user ID, the user logs in to the cloud repository service 300, and uploads and downloads files. In principle, the user ID in the cloud repository service 300 is unrelated to an in-house ID or a user ID (cloud ID) in the cloud print service 200. However, a common user ID is used in services that are related to each other. Hereinafter, a cloud ID that is common to that in the cloud print service 200 is used as a user ID in the cloud repository service 300 in order to simplify the description.

As has been described in the section of the related art, a print job registered in the cloud print service 200 is linked to the cloud ID of the user who has given the print instruction, but is generally not linked to the in-house ID of the user. At the same time, it is expected that there would be more occasions in which the cloud print service 200 is used to perform printing with the image forming apparatus 110 in the in-house network 100. Therefore, it is meaningful to be able to perform recording and aggregation using the in-house IDs of users for printing via the cloud print service 200.

According to the exemplary embodiment, the case is described by way of example in which, when printing is performed with the image forming apparatus 110 in the in-house network 100 via the cloud print service 200, the image forming apparatus 110 gives the in-house ID of a person who gives a print instruction to the cloud print service 200, and, when the cloud print service 200 sends print data to the image forming apparatus 110, the in-house ID is additionally transferred to the image forming apparatus 110.

Because the cloud print service 200 performs user authentication using the cloud ID and does not recognize the in-house ID as a user ID, it is meaningless when the image forming apparatus 110 gives the in-house ID as a user ID to the cloud print service 200. Therefore, according to the exemplary embodiment, the in-house ID is transferred using the inherent function of the cloud print service 200. This inherent function sends setting information for printing, which has been set in the logical printer 210 (for example, information indicating the functions used in printing, such as duplex printing and collation), to a physical printer at an output destination in association with print data.

For example, a Cloud Print is configured to hold print setting information (referred to as a "print ticket" or a "job ticket") in association with the logical printer 210, and, when providing print date from the logical printer 210 to its physical printer, additionally provide the print setting information. The print setting information may include an element that the user may uniquely define (referred to as a "uniquely defined element"). That is, the setting information including a uniquely defined element including the in-house ID is set in the logical printer 210, and accordingly, the in-house ID may be transferred, together with print data, to the image forming apparatus 110.

As a method of setting print setting information (print ticket) including a uniquely defined element that indicates the in-house ID of a user in the logical printer 210 in the cloud print service 200, there is a method of sending a logical printer generation instruction with which such a print ticket is associated to the cloud print service 200. For example, when the print control technology of the ".NET Framework" (trademark) developed by Microsoft (registered trademark) is used, print setting information is configured as an instance in the PrintTicket class. Upon receipt of a logical printer generation instruction, the cloud print service 200 newly generates a logical printer 210 in which the print ticket is set. In the exemplary embodiment, this method is used by way of example. When an instruction to print document data is given to the logical printer 210 generated in response to the logical printer generation instruction, the logical printer 210 converts the document data into print data in a page description language, and sends the print data, together with the print ticket (including the in-house ID), to the image forming apparatus 110.

As another method, there is a method of generating a logical printer 210 in which, instead of a print ticket, an element including the in-house ID is incorporated in setting information that indicates the capability information of a physical printer associated with the logical printer 210 (the capability information indicating whether the printer is capable of performing, for example, duplex printing and/or color printing). In this method, the image forming apparatus under 110 incorporates an element that indicates the in-house ID in setting information that indicates the capability information thereof, and sends a logical printer generation instruction with which the setting information is associated to the cloud print service 200. In response to the logical printer generation instruction, the cloud print service 200 generates a logical printer 210 in which the setting information is set. When the print control technology of the ".NET Framework" (trademark) is used, the setting information is configured as an instance in the PrintCapability class. In this method, a client apparatus (such as the image forming apparatus 110) that is to perform printing using the logical printer 210 receives, from the logical printer 210, setting information that indicates the capability of a physical printer to be used (such as PrintCapability), and accepts a choice(s) selected by a user from among choices of various functions included in the setting information. The result of the selected choice(s) becomes print setting information for the printing. Here, when an element that indicates the in-house ID is incorporated in the setting information provided to the client apparatus, that element is handed over to the print setting information. The print setting information is sent from the client apparatus to the cloud print service 200 and is set in the logical printer 210. The print setting information (including the in-house ID) is associated with print data sent from the logical printer 210 to the physical printer (such as the image forming apparatus 110 itself).

Both methods use the inherent function of the cloud print service 200, which associates, when the logical printer 210 sends print data to a physical printer such as the image forming apparatus 110, setting information set therein with the print data and sends the setting information and the print data. Therefore, there is no need to change the functions of or add functions to the existing cloud print service 200 in order to realize this mechanism. It is only necessary to add, to the image forming apparatus 110, the function of instructing the cloud print service 200 to generate such a logical printer 210. Hereinafter, an example of the image forming apparatus 110 with this function according to the exemplary embodiment will be described with reference to FIG. 2.

The UI unit 112 is a mechanism for accepting a local operation from a user (such as a direct operation entered by a hand or the like). For example, the UI unit 112 includes input and display hardware such as a touch panel and mechanical buttons. The UI unit 112 exchanges information with a user via the hardware.

An authentication processing unit 114 performs a process for authenticating a user who locally operates the image forming apparatus 110. The user authentication is performed using an in-house ID instead of a cloud ID. A known method may be used as a method of inputting authentication information to the authentication processing unit 114. For example, there are various methods, such as the method of inputting an in-house ID and password to the UI unit 112, or the method of performing authentication by communicating with an IC card-type ID card (that stores information of an in-house ID) of a user by using an IC card reader attached to the image forming apparatus 110. When the user authentication performed by the authentication processing unit 114 is successful, the in-house ID of the user who is operating the image forming apparatus 110 is specified. Alternatively, instead of the authentication processing unit 114 performing user authentication, the authentication processing unit 114 may request an authentication server in the in-house network 100 to perform user authentication.

For a user who has been successfully authenticated, a logical printer setting unit 126 performs a process for establishing (such as newly generating), in the cloud print service 200, a logical printer 210 in which setting information including the in-house ID of the user is set. The in-house ID of the user is information known to an image forming unit 120 because of the successful user authentication described above. Therefore, for example, the logical printer setting unit 126 generates setting information (such as a print ticket) including the in-house ID as an element, and sends, to the cloud print service 200, a generation instruction to generate a logical printer 210 that has the setting information as its setting contents. In response to the generation instruction, the cloud print service 200 generates a logical printer 210. In the logical printer 210, the setting information including information of the in-house ID is set.

In order to generate a logical printer 210, the logical printer setting unit 126 needs to log in to the cloud print service 200. This logging in may be performed, in place of the user, by the logical printer setting unit 126 using the cloud ID of the user or using the cloud ID of the image forming apparatus 110 (or the cloud ID of a system administrator, which is held by the image forming apparatus 110). Here, in the former case (logging in in place of the user), needless to say, that user is capable of using the generated logical printer 210. In contrast, in the latter case (logging in with the ID of the image forming apparatus 110), the generated logical printer 210 is owned by the image forming apparatus 110, and, when no change is made, the user who has been authenticated has no right to use the logical printer 210. In this case, the logical printer setting unit 126 registers, in the generated logical printer 210, the cloud ID of the user as a person who has the right to access and use the logical printer 210. The logical printer 210 generated in this manner is unique to the user (since other users are not registered as users of the logical printer 210).

In order to generate a logical printer 2010 for a user and to enable the user to use the generated logical printer 210 for printing, the cloud ID of the user needs to be presented to the cloud print service 200. There are some methods for obtaining the cloud ID of the user.

In one example, the cloud ID may be input by the user to the image forming unit 120, together with authentication information such as the in-house ID for the user authentication. For example, a UI screen of the UI unit 112 for prompting the user to input authentication information (that is, the in-house ID and password) for logging in to the image forming apparatus 110 (and to the in-house network 100) may include a section for inputting the cloud ID, and the user may be prompted to additionally input the cloud ID. At the same time, the user may be prompted to input certificate information such as a password for user authentication in the cloud print service 200.

In another example, the IC card-type ID card may include the cloud ID (and certificate information for the cloud print service 200, which corresponds to the cloud ID). When user authentication using the in-house ID in the ID card is performed via an IC card reader of the image forming apparatus 110, the cloud ID and the like may be obtained from the ID card. In yet another example, the cloud ID corresponding to the in-house ID (and, in some cases, certificate information for the cloud print service 200, which corresponds to the cloud ID) may be registered in a directory service provided in the in-house network 100, and the cloud ID may be obtained from the directory service. In this case, for example, the logical printer setting unit 126 obtains, from the directory service, the cloud ID and the like corresponding to the in-house ID of the user, which is obtained from the authentication processing unit 114.

The logical printer setting unit 126 generates a logical printer 210 in which setting information including the in-house ID of the user is set by using, for example, the method of generating a logical printer 210 in place of the user by using the cloud ID obtained in this manner, or the method of setting the cloud ID of the user as a user of a logical printer 210 generated with the ID thereof. In the former case, because the user has already been logged in to the cloud print service 200 at the time of generating a logical printer 210, a print instruction unit 128 may afterwards give a print instruction to the logical printer 210 using the name (that is, the cloud ID) of that user. In contrast, in the latter case, before the print instruction unit 128 gives a print instruction to the logical printer 210, the image forming apparatus 110 may send the cloud ID and the like of the user to the cloud print service 200 for logging in, and a print instruction may be given afterwards.

At the time of giving an instruction to generate a logical printer 210, the logical printer setting unit 126 registers, as a physical printer corresponding to the logical printer 210, the image forming apparatus 110 itself in the logical printer 210. Upon the registration, the capability information of the image forming apparatus 110 may be set in the logical printer 210. With this registration, a unique physical printer ID (that is, an ID that uniquely identifies a physical printer) is given from the cloud print service 200 to the image forming apparatus 110. By presenting the physical printer ID to the cloud print service 200, the image forming apparatus 110 certifies that the image forming apparatus 110 is a physical printer registered in the logical printer 210, and obtains a print job held in the logical printer 210.

In the case of the method of sending a logical printer generation instruction including a print ticket from the logical printer setting unit 126 to the cloud print service 200, upon generation of a logical printer 210 in the cloud print service 200, print settings (association of the print ticket with the logical printer 210) are completed. When a print instruction is input to the logical printer 210, print data to be printed is only necessary to be sent, in association with the print ticket, to the image forming apparatus 110. That is, in this case, the print instruction unit 128 of the image forming apparatus 110 does not need to perform print settings, which will be described later.

Alternatively, in the case of the method of sending a logical printer generation instruction including the capability information of the image forming apparatus 110, instead of a print ticket, from the logical printer setting unit 126 to the cloud print service 200, the capability information it set as setting information in a logical printer 210 generated in response to this logical printer generation instruction. The setting information is provided to the image forming apparatus 110 for enabling the print instruction unit 128 to perform operations regarding print settings, and the print instruction unit 128 accepts print settings entered from a user on the basis of the setting information and generates a print ticket. The print ticket is sent to the cloud print service 200 and is associated with the logical printer 210. When print data is provided from the logical printer 210 to the image forming apparatus 110, the print ticket is also provided.

At the time the user finishes using the logical printer 210 which has been generated for the user, the logical printer setting unit 126 may delete the logical printer 210. "At the time the user finishes using" the logical printer 210 may take various instances. For example, after the logical printer 210 has been generated, the user may have finished using the logical printer 210 upon successful completion of obtaining of a print job from the logical printer 210. Alternatively, the user may finish using the logical printer 210 upon completion of printing of the obtained print job. In these examples, the logical printer 210 is deleted upon printing of a document. When plural documents are to be printed, one logical printer 210 is generated for printing each document.

In another example, the point at which user authentication by the authentication processing unit 114 of the image forming apparatus 110 is canceled is understood as the point at which the user no longer uses the image forming apparatus 110, that is, the user has finished using the logical printer 210. Cancellation of user authentication is performed when, for example, the user explicitly performs an operation to cancel authentication (logging out), or when no user operation is performed on the image forming apparatus 110 over a predetermined time after completion of a print job in response to a user instruction (timeout).

Whether to generate and delete a logical printer 210 for each document, or whether to delete a logical printer 210 after cancellation of authentication may be selectable in accordance with the settings of the image forming apparatus 110 or in response to an instruction from each user.

The print instruction unit 128 is a unit that gives an instruction to perform printing using the logical printer 210 generated by the logical printer setting unit 126. Here, copying a document set in the image forming apparatus 110 or printing document data or the like in a document server in the in-house network 100 basically does not involve usage of the cloud print service 200 outside the in-house network 100. Mainly, conceivable occasions in which the cloud print service 200 is used include occasions to print document data in a data storage apparatus (as a representative thereof, the cloud repository service 300 is illustrated by way of example in FIG. 1) outside the in-house network 100. In this case, the print instruction unit 128 logs in to the cloud repository service 300 with the ID of a user (in this example, logging in is possible with the same ID as the cloud ID in the cloud print service 200 as described above), and obtains a list of pieces of document data registered by the user in the cloud repository service 300. The obtained list is displayed on the UI screen of the UI unit 112, and the user is prompted to select at least one piece of document data to be printed from the list. The print instruction unit 128 generates a print instruction that includes information for specifying each piece of document data selected to be printed and that specifies the logical printer 210 generated previously as a print destination, and sends the print instruction to the cloud repository service 300. The print instruction includes, as information for specifying the logical printer 210, information for specifying the cloud print service 200 (domain name or the like) and the ID of the logical printer 210 in the cloud print service 200. Of these pieces of information, the information for specifying the cloud print service 200 is registered in advance in the image forming apparatus 110 (for the necessity to access the cloud print service 200). In contrast, the ID of the logical printer 210 is provided upon an instruction made by the logical printer setting unit 126 to generate a logical printer 210, from the cloud print service 200, which has generated the logical printer 210 in response to that instruction, to the logical printer setting unit 126 as a response to that instruction.

Also, when accepting at least one document selected by the user to be printed, the print instruction unit 128 may obtain setting information (capability information) of a physical printer to be used this time (that is, the image forming apparatus 110), which is set in the logical printer 210, generate, on the basis of the setting information, a screen for accepting an input of print settings for printing of the document(s) to be printed and display the generated screen on the UI unit 112, and accept an input of print settings. When an instruction to generate a logical printer 210 has been made using, as a parameter, capability information of the physical printer instead of using a print ticket (print setting information), such print settings are made when an instruction to print the document(s) is made. As has been described above, the setting information (capability information) of the logical printer 210 includes information of choices of the individual functions of the image forming apparatus 110, such as duplex/simplex, color/monochrome, usable sheet sizes, and stapling/no stapling. The setting information (capability information) of the logical printer 210 further includes information of the in-house ID. The logical printer 210 presents the setting information to the print instruction unit 128. On the basis of the setting information, the print instruction unit 128 displays, on the UI unit 112, a UI screen including an input unit for selecting one from the choices of each function and an input unit for inputting a numeral such as the number of prints to be made, thereby prompting the user to select one from the choices of each function and to input a numeral. The results of such selected choices and input numeral become print settings for printing this time. The print instruction unit 128 generates a print ticket that indicates the contents of the print settings. Since the setting information of the logical printer 210, which has been obtained from the logical printer 210, includes an element that indicates the in-house ID, the element indicating the in-house ID may be left in the print ticket which has been generated on the basis of the setting information. The generated print ticket may be incorporated in a print instruction for the cloud repository service 300 and may be set in the logical printer 210 in the cloud print service 200 via the cloud repository service 300, or may be directly set in the logical printer 210.

In the above-described example in which generation and print settings of the logical printer 210 are done at the same time using a print ticket including the in-house ID, it is unnecessary to input print settings at the print instruction unit 128, which has been described here (and, in response to this, transfer of the print ticket to the logical printer 210). However, print settings may be made at the print instruction unit 128 when the user wants to make settings different from print settings made upon generation of the logical printer 210.

Upon receipt of the print instruction, the cloud repository service 300 gives, by using information included in the print instruction, a print instruction that specifies the selected document data to be printed, to the logical printer 210 in the cloud print service 200.

Upon receipt of the print instruction, the logical printer 210 converts each piece of the selected document data into print data in a page description language that the image forming apparatus 110 is capable of handling (such as data in the PDF format), and provides information of a print job including the print data and the print ticket set in the logical printer 210 to the image forming apparatus 110. The print ticket includes the in-house ID of the user, which is included in the setting information set in the logical printer 210. Alternatively, the information of the print job provided from the logical printer 210 to the image forming apparatus 110 may include, instead of the entity data of the print data and/or the print ticket, information such as a URL for obtaining these pieces of entity data. Such information of the print job is received by a job receiving unit 118 of the image forming apparatus 110 and is conveyed to a job management unit 116.

The job management unit 116 generates a job in response to a local processing instruction from the UI unit 112 to the image forming apparatus 110 or a processing instruction from a remote apparatus via a network, and manages execution of the job.

The user who has been authenticated is enabled to give various processing instructions, such as copying and scanning instructions, from the UI unit 112. In response to such a processing instruction, the job management unit 116 generates a job for managing the processing, and performs job management such as queue management. The job management unit 116 controls each device of the image forming apparatus 110 to execute the job. For example, upon receipt of a copying instruction, a scanner in the image forming apparatus 110 is activated to read a document, and the image forming unit 120 prints, on a sheet, an image obtained as a result of reading the document.

The job management unit 116 receives, at the job receiving unit 118, print data from another apparatus (including the cloud print service 200 on the Internet 400) via the in-house network 100, and generates and manages a job corresponding to the print data. When that job becomes the top item in the execution order, the job management unit 116 causes the image forming unit 120 to print the print data of the job on a sheet.

The job management unit 116 receives print data corresponding to the print instruction received by the job receiving unit 118 from the cloud print service 200 and a print ticket, generates a job regarding the print data, and causes the image forming unit 120 to execute the job (that is, causes the image forming unit 120 to perform printing). Here, a setting extraction unit 117 extracts the value of the in-house ID included in the print ticket. The extracted in-house ID is used for recording a log or the like. Alternatively, the setting extraction unit 117 may extract information of print settings from the print ticket, and the job management unit 116 may control the image forming apparatus 110 to perform an operation in accordance with the print settings.

A log recording processing unit 122 records, in a log storage unit 124, processing log information of each job executed under management of the job management unit 116. The recorded log information includes information of the in-house ID of a user who has given an instruction to execute the job. The log information further includes information of various items that are generally recorded in the field of processing log management of image forming apparatuses, such as the job execution time and date, print setting information in the case of printing (duplex printing or not, color printing or monochrome printing, etc.), and the number of prints made. The log information of each job, which is stored in the log storage unit 124, is used for aggregation of the amount of usage of the image forming apparatus 110 by each section or each user in the company or charges for each section or each user in the company. The aggregation is performed by, for example, the aggregation apparatus 150 in the in-house network 100. In the aggregation, for each piece of log information stored in the log storage unit 124, a user who has executed a job regarding the log information and, as occasion calls, a section to which the user belongs are specified on the basis of the in-house ID included in the log information. The amount of usage, such as the number of prints made in the job (or charges in accordance with the amount of usage), is added to the aggregated value of the amount of usage (charges) of the specified user and section.

In the log storage unit 124, the in-house ID in the job is recorded as an ID for specifying the user who has given the job instruction. Accordingly, the amount of usage (charges) may be aggregated for each user or for each section by referring to in-house organization information.

In the case of a local processing instruction or a processing instruction from another apparatus in the in-house network 100, information of the processing instruction includes the in-house ID of a user who has given the instruction. Thus, the log recording processing unit 122 may only need to incorporate that in-house ID in the log information and to record the log information.

In contrast, for print data sent from the logical printer 210 in the cloud print service 200 to the image forming apparatus 110, it is only necessary to incorporate, in the log information, an in-house ID extracted by the setting extraction unit 117 from a print ticket that accompanies the print data.

Figure 2:
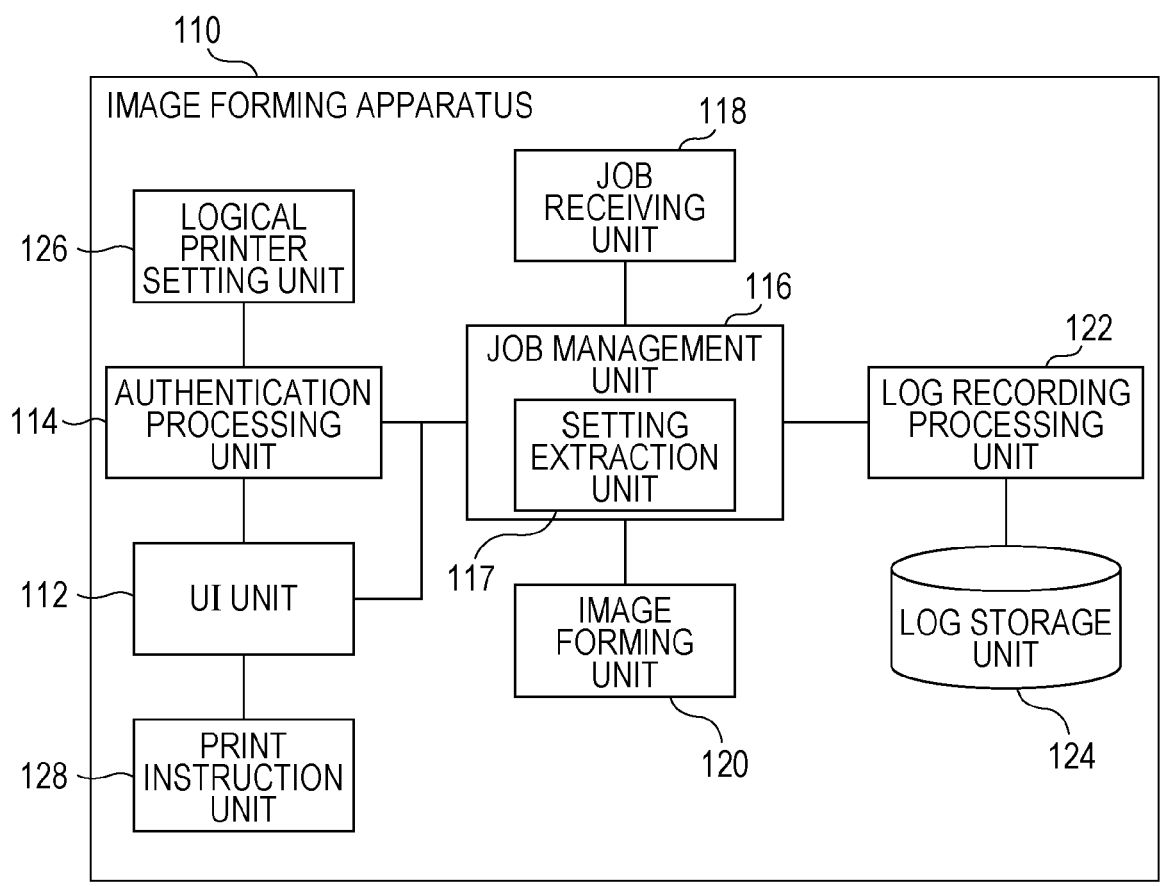
FIG. 2 is a diagram illustrating an example of the functional configuration of an image forming apparatus according to the exemplary embodiment.

In the example illustrated in FIG. 2, the log storage unit 124 is provided in the image forming apparatus 110. Alternatively, the log storage unit 124 may be provided in another apparatus (such as the aggregation apparatus 150) in the in-house network 100, and the log recording processing unit 122 may write log information in that apparatus.

The configuration and functions of the image forming apparatus 110 according to the exemplary embodiment have been described above. Next, an example of the flow of a printing process using the cloud print service 200 from the image forming apparatus 110 will be described.

Figure 3:
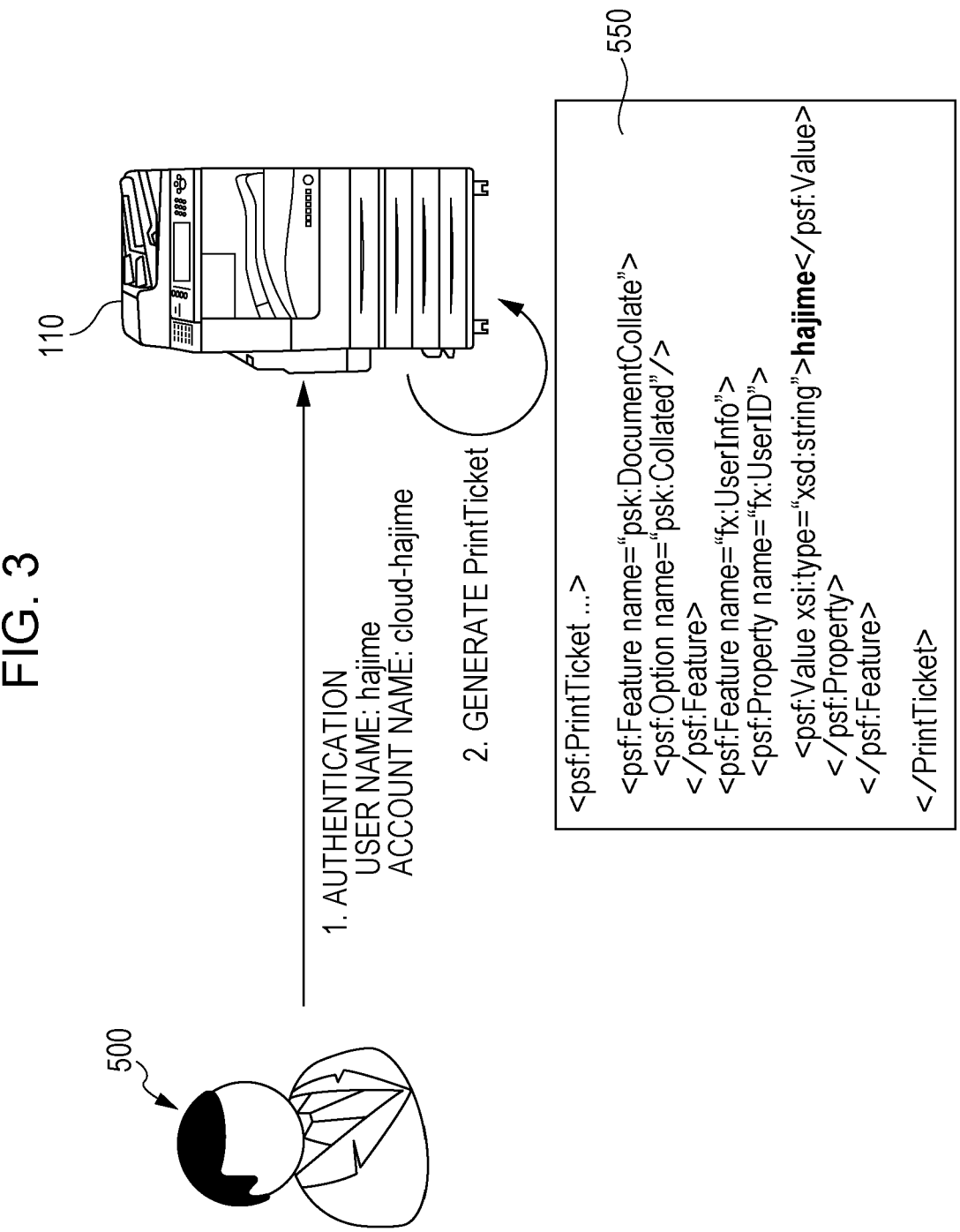
FIG. 3 is a diagram illustrating a portion of the flow of a printing process according to the exemplary embodiment.

As illustrated in FIG. 3, a user 500 who wants to print document data in the cloud repository service 300 by using the cloud print service 200 goes to the nearest image forming apparatus 110 in the in-house network 100, and (1) the user 500 performs a user authentication operation on the image forming apparatus 110. Upon the user authentication operation, the user 500 inputs (by hand or by presenting an IC card-type employee ID card) the in-house ID (the user name "hajime" in the illustrated example) and the cloud ID (the account name "cloud-hajime" in the illustrated example) to the authentication processing unit 114 of the image forming apparatus 110. As described previously, user authentication on the image forming apparatus 110 is performed on the basis of the in-house ID. Although the user 500 additionally inputs the cloud ID in this example, the cloud ID may be obtained from an in-house directory server.

When the user authentication is successful, in the example illustrated in FIG. 3, (2) the logical printer setting unit 126 generates, as a PrintTicket 550, setting information of a logical printer 210 to be generated. The PrintTicket 550 in this example is written in an eXtensible Markup Language (XML) and is generated as, for example, an instance in the PrintTicket class used in the print control technology of the ".NET Framework" (trademark) developed by Microsoft (registered trademark). The PrintTicket class defines print settings (configuration space of a device to be used in the job) to be applied to a print job serving as a target. Here, the PrintTicket class is appropriated to the settings of a logical printer 210 to be generated. For example, the description of the second and third rows from the top of the PrintTicket 550 illustrated in FIG. 3 indicates that the choice "psk:Collated" (perform collation) is selected with regard to the function named "psk:DocumentCollate" (collation of print output) of the image forming apparatus 110. That is, in a print job to which the PrintTicket 550 is applied, the image forming apparatus 110 is instructed to collate the printed sheets. After the user authentication, the image forming apparatus 110 displays a screen for inputting print settings, accepts an input of print settings from the user 500, and incorporates the print settings in such a form in the PrintTicket 550.

The fifth to ninth rows from the top of the PrintTicket 550 illustrated in FIG. 3 are elements describing the in-house ID of the user 500. In this example, the element named "fx: UserInfo" which indicates user information includes the element named "fx:UserID" which indicates the in-house ID attribute, and the in-house ID attribute element includes an element including the character string "hajime" which is the value of the in-house ID. The cloud print service 200 need not understand the contents of these elements in the fifth to ninth rows or execute control in accordance with the contents. These elements in the fifth to ninth rows may be elements that are uniquely defined on the in-house network 100 side.

The cloud print service 200 sets the PrintTicket 550 in the generated logical printer 210. In response to a print instruction given to the logical printer 210 afterwards, it is only necessary for the cloud print service 200 to associate the PrintTicket 550 with print data generated in response to the print instruction and to provide the PrintTicket 550 and the print data to the image forming apparatus 110.

Figure 4:
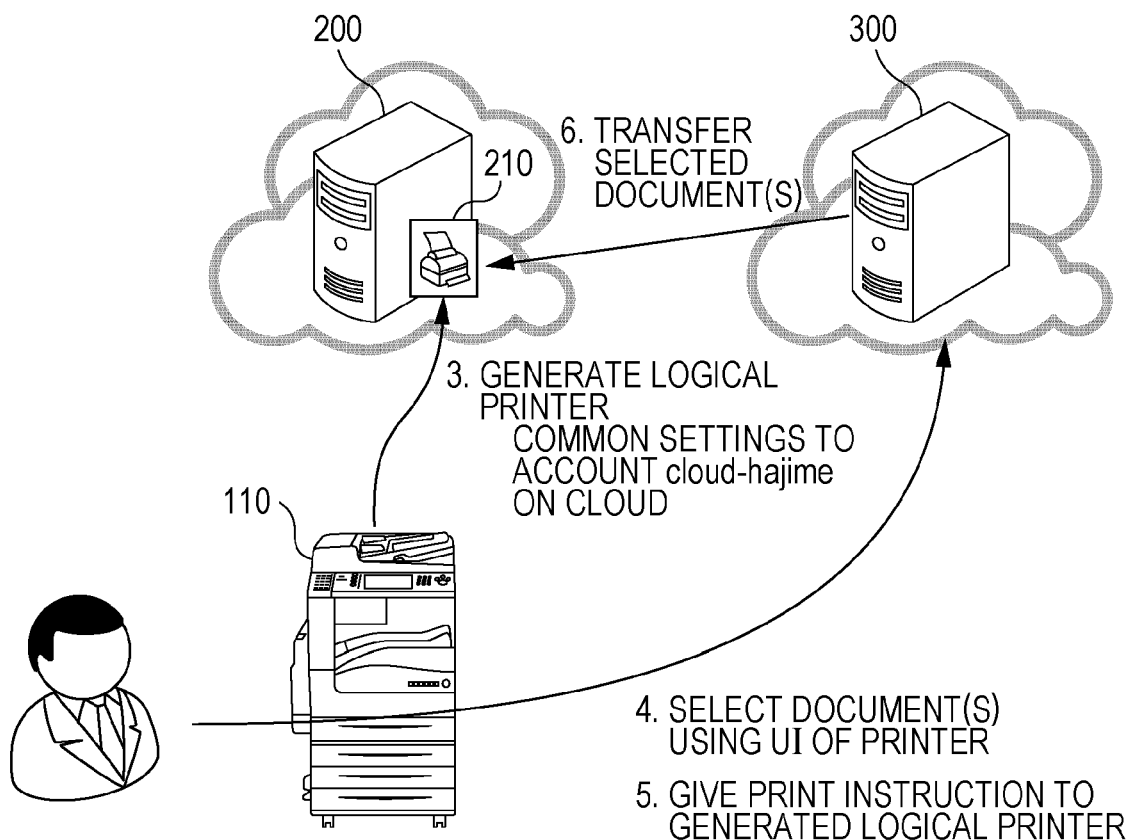
FIG. 4 is a diagram illustrating a portion of the flow of the printing process according to the exemplary embodiment.

When the PrintTicket 550 is generated, as illustrated in FIG. 4, (3) the logical printer setting unit 126 of the image forming apparatus 110 sends the PrintTicket 550 together with an instruction to newly generate a logical printer 210 to the cloud print service 200. Upon receipt of the instruction, the cloud print service 200 newly generates a logical printer 210 and sets the PrintTicket 550 in the generated logical printer 210 (for example, the cloud print service 200 saves the PrintTicket 550 in association with the ID of the logical printer 210). The PrintTicket 550 includes the in-house ID "hajime" of the user 500 who has been authenticated in the above (1). Also, the logical printer setting unit 126 sets, in the logical printer 210, the cloud ID "cloud-hajime" of the user 500, which has been obtained in the user authentication in the above (1), as a person (such as a sharer) who has the right to use the logical printer 210.

Next, (4) the print instruction unit 128 logs in to the cloud repository service 300 using the cloud ID "cloud-hajime" and gives an instruction to search for document data that "cloud-hajime" has the right to print from among pieces of document data saved in the cloud repository service 300. In response to this instruction, the cloud repository service 300 executes the search and provides a list of pieces of document data obtained as a result of the search to the print instruction unit 128. This list is provided as, for example, a webpage for selecting a document(s) and giving a print instruction. The print instruction unit 128 displays the list on the screen of the UI unit 112, and accepts at least one document selected, from the list, by the user 500 to be printed.

When the user 500 finishes selecting at least one piece of document data to be printed and inputs an instruction to execute printing to the UI unit 112, (5) the print instruction unit 128 sends a print instruction including information indicating the selected piece(s) of document data and information specifying the logical printer 210 (generated in the above (3)) in the cloud print service 200, which performs printing, to the cloud repository service 300.

(6) In response to the print instruction, the cloud repository service 300 sends a print instruction including the selected piece(s) of document data (or information such as a URL for specifying the selected piece(s) of document data) to the specified logical printer 210.

Figure 5:
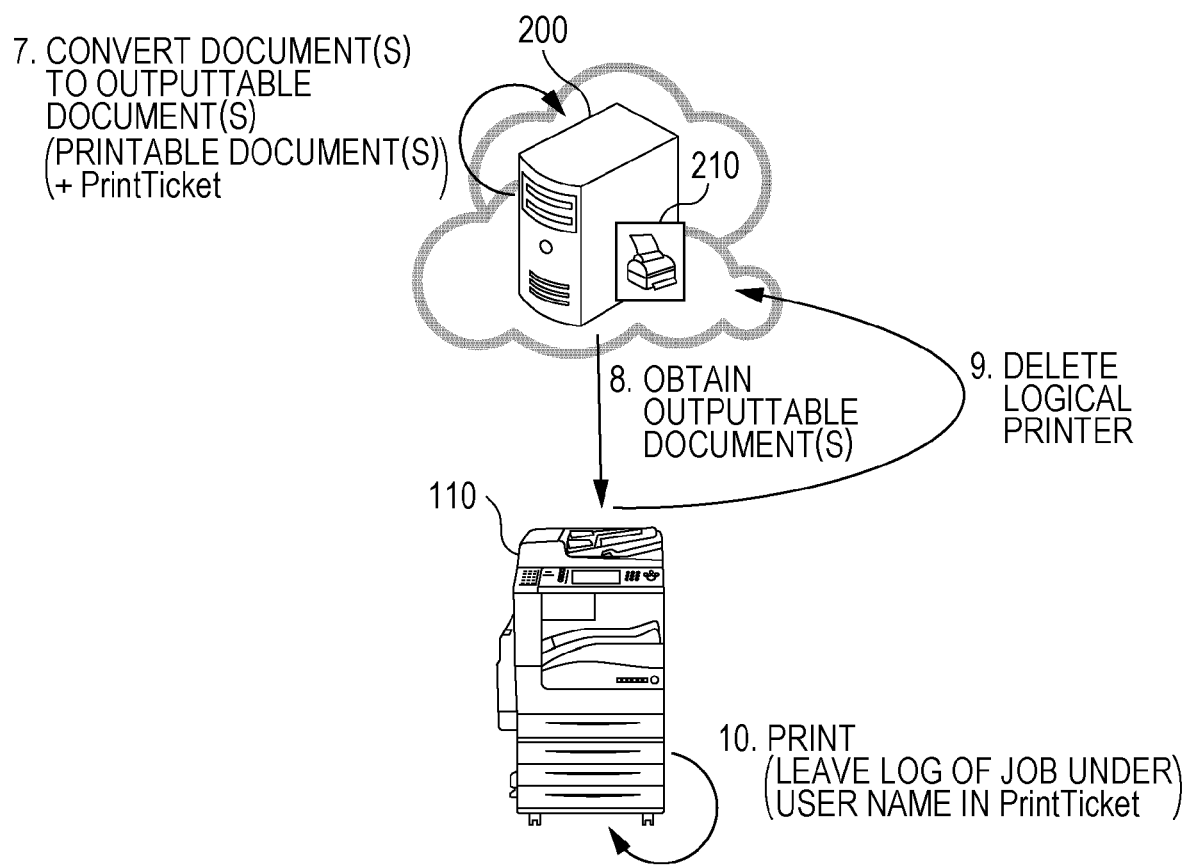
FIG. 5 is a diagram illustrating a portion of the flow of the printing process according to the exemplary embodiment.

Upon receipt of the print instruction, as illustrated in FIG. 5, (7) the logical printer 210 converts the document data to be printed into print data in a data format such as PDF that is printable with the image forming apparatus 110 (indicated as a "printable document(s)" in FIG. 5). The logical printer 210 generates outputtable document data including the print data and the PrintTicket 550 set in the logical printer 210.

(8) The generated outputtable document data is provided from the logical printer 210 to the image forming apparatus 110. When the image forming apparatus 110 is behind the firewall of the in-house network 100 and the logical printer 210 is incapable of sending the outputtable document data across the firewall to the image forming apparatus 110, the following may be performed. For example, the logical printer 210 sends a message indicating that the outputtable document data has been prepared to the image forming apparatus 110 at an output destination by using a protocol that may go through the firewall. Upon receipt of the message, the image forming apparatus 110 requests the logical printer 210 for the outputtable document data by using a protocol that may go through the firewall, such as HTTP, and obtains the outputtable document data as a response in response to the request. Since the address of the image forming apparatus 110 has been registered in the logical printer 210 at the time the logical printer 210 has been generated, the logical printer 210 may send a message to the image forming apparatus 110 by using that address. Alternatively, for example, the image forming apparatus 110 may periodically access the logical printer 210 by using a protocol such as HTTP (polling), and may obtain outputtable document data if there is any outputtable document data addressed to the image forming apparatus 110.

(9) In the example illustrated in FIG. 5, at the time (or immediately after) the image forming apparatus 110 normally completes obtaining of the outputtable document data from the logical printer 210, the image forming apparatus 110 gives an instruction to the cloud print service 200 to delete the logical printer 210. The timing of deleting the logical printer 210 is not limited to this example. As has been described above, the logical printer 210 may be deleted upon cancellation of the user authentication. Anyway, the logical printer 210 is deleted at the time the user 500 who has given the print instruction finishes using the logical printer 210.

If the generated logical printer 210 is not deleted, the logical printer 210 may be used by a different user by using some way. In that case, even though the logical printer 210 has been used by the different user, it is recorded in the log storage unit 124 that the logical printer 210 has been used by the user 500 with the in-house ID included in the settings in the logical printer 210. In contrast, as in the above (9), when the logical printer 210 is immediately deleted after the user 500 finishes using the logical printer 210, such abuse of the logical printer 210 by third person is prevented.

(10) The image forming apparatus 110, which has obtained the outputtable document data, performs printing on a sheet in accordance with the data. The image forming apparatus 110 records log information of the printing in the log storage unit 124. In the log information, the value of the in-house ID included in the PrintTicket 550 in the outputtable document data is recorded as a user ID item indicating the user who has given the print instruction. In this way, the printing is recorded as being performed by the user with that in-house ID, and the aggregation apparatus 150 performs aggregation in accordance with that in-house ID.

As has been described above, according to the exemplary embodiment, with the use of the mechanism of the cloud print service 200 in which setting information such as the PrintTicket 550 set in the logical printer 210 is provided, together with print data, to the image forming apparatus 110, the in-house ID of a user that is inherently not under management of the cloud print service 200 is provided in association with print data to the image forming apparatus 110.

According to the exemplary embodiment, the logical printer 210 is deleted at the time the use of the logical printer 210 including the in-house ID of the user is finished. Therefore, the risk of the logical printer 210 being used by people other than that user is very low.

According to the exemplary embodiment, information of print settings in which the functions of the image forming apparatus 110 at the time the user performs printing are reflected is included in the PrintTicket 550 and set in the logical printer 210. Therefore, the logical printer 210 functions as a printer that reflects the latest functions of the image forming apparatus 110 at that time.

In the above-described example illustrated in FIGS. 3 to 5, the print instruction unit 128 presents, from the UI unit 112 of the image forming apparatus 110, a list of documents only on the cloud repository service 300 to the user and accepts a document(s) selected by the user to be printed. However, this is only an example. Alternatively, the print instruction unit 128 may obtain a list of documents that the user has the right to print from document servers on the cloud repository service 300 and the in-house network 100, display the list of the documents saved outside and inside the company on the UI unit 112, and accept a document(s) selected from the list to be printed. In this case, when a document on the cloud repository service 300 is selected to be printed, printing is performed using the cloud print service 200 in the above-described manner. When a document on the in-house server is selected, the image forming apparatus 110 obtains the document from the server and prints the document by using an existing method.

In the example illustrated in FIGS. 3 to 5, when the user 500 performs user authentication on the image forming apparatus 110, the logical printer setting unit 126 automatically generates a logical printer 210 for that user 500 in the cloud print service 200. However, this is only an example. Alternatively, even when the user authentication is successful, a logical printer 210 may not be immediately generated. Instead, a logical printer 210 may be generated only after the cloud print service 200 is selected in a function menu of the UI unit 112. In this example, no logical printer 210 is generated when a menu item other than the cloud print service 200, such as copying or printing of a document on a document server on the in-house network 100, is selected. In this example, at the time of the user authentication, the user 500 may not be asked to input the cloud ID. The user 500 may be asked to input the cloud ID only when the cloud print service 200 is selected.

Figure 6:
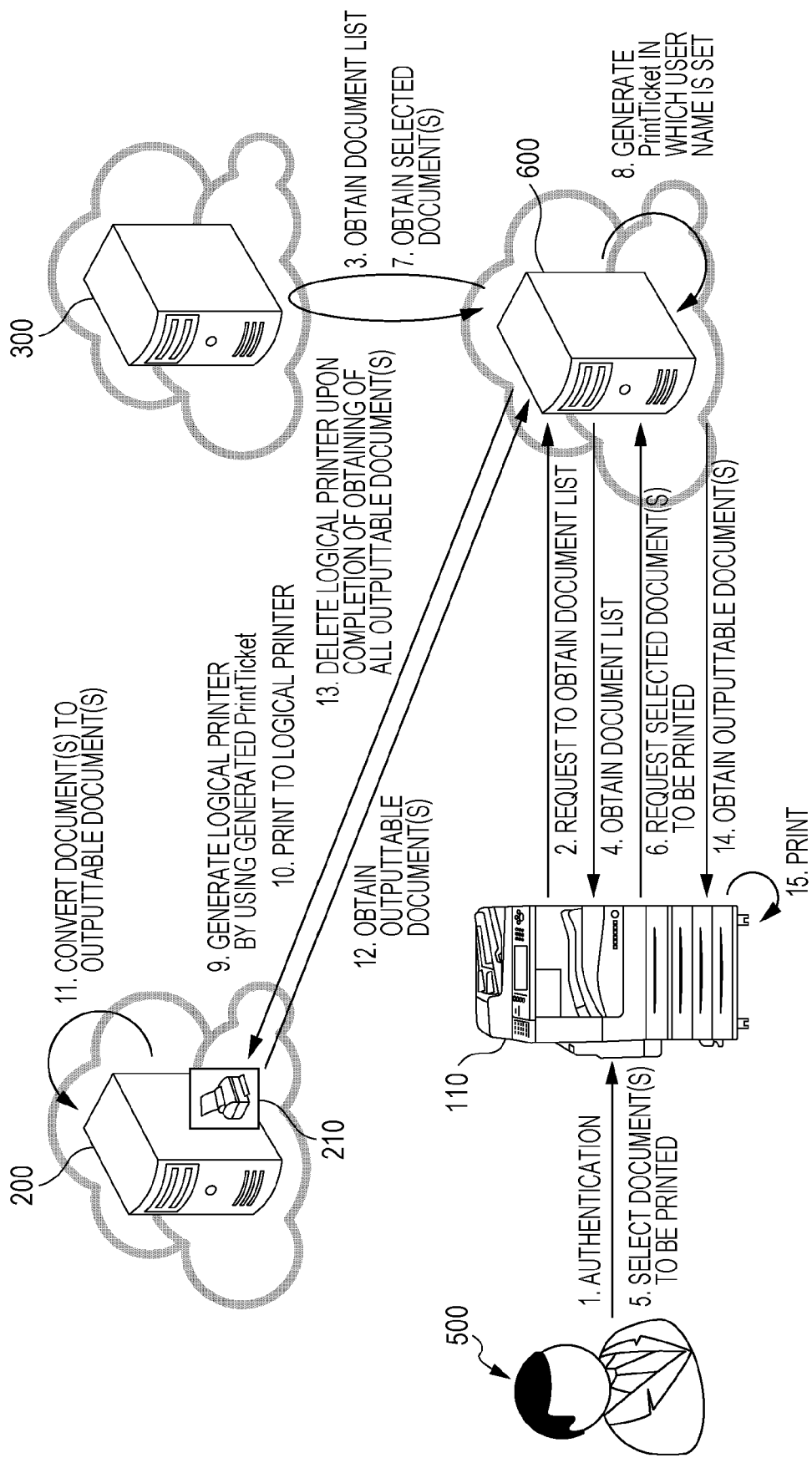
FIG. 6 is a diagram illustrating the configuration of a system and the flow of a printing process according to a modification.

Next, referring to FIGS. 6 and 7, a modification of the above-described exemplary embodiment will be described. A system according to this modification includes an intermediary apparatus 600. The intermediary apparatus 600 is realized as a system, outside the image forming apparatus 110, which has the functions (such as the logical printer setting unit 126 and the print instruction unit 128) included in the image forming apparatus 110 in the above-described exemplary embodiment for exchanging information with the cloud print service 200 and the cloud repository service 300. When performing printing using the cloud print service 200, the image forming apparatus 110 requests the intermediary apparatus 600 to perform processing for the printing.

The intermediary apparatus 600 may be realized as a service (configured as a single server or a cloud system including plural computers) on the Internet 400 or a server on the in-house network 100. Alternatively, a computer that serves the functions of the intermediary apparatus 600, which will be described below, may be included in a housing of the image forming apparatus 110.

Figure 7:
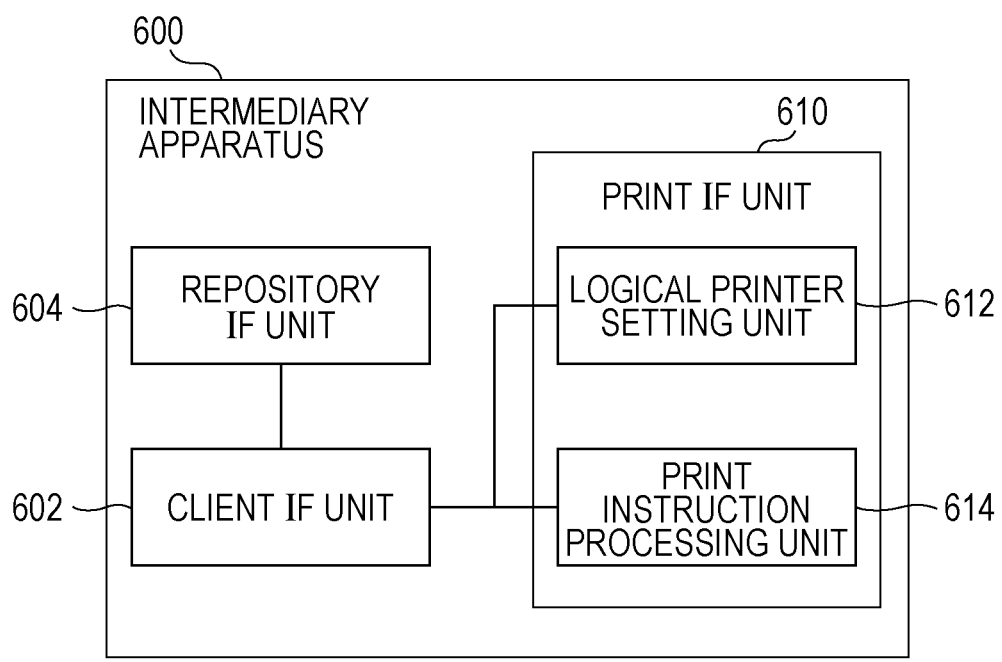
FIG. 7 is a diagram illustrating an example of the functional configuration of an intermediary apparatus according to the modification.

As illustrated in FIG. 7, the intermediary apparatus 600 includes a client interface (IF) unit 602, a repository IF unit 604, and a print IF unit 610. The client IF unit 602 is a function module that performs communication and processing with a client apparatus (that is, the image forming apparatus 110 in this case) necessary for realizing printing via the cloud print service 200. The client IF unit 602 provides an interface for printing using a cloud from the image forming apparatus 110 in the form of, for example, a Web service. The repository IF unit 604 is a function module that performs communication and processing with the cloud repository service 300. The print IF unit 610 is a function module that performs communication and processing with the cloud print service 200. The print IF unit 610 includes a logical printer setting unit 612 and a print instruction processing unit 614, which have functions that are the same as or similar to the logical printer setting unit 126 and the print instruction unit 128 of the image forming apparatus 110 according to the exemplary embodiment.

Referring back to FIG. 6, (1) when the user 500 comes to the image forming apparatus 110 to be successfully authenticated, and selects execution of printing using the cloud print service 200 from the UI screen of the image forming apparatus 110, (2) the image forming apparatus 110 sends a request for obtaining a document list for printing to the intermediary apparatus 600. This request for obtaining a document list gives an instruction to start a print session using the cloud print service 200, and information of this request includes the in-house ID and the cloud ID of the user 500 who has been confirmed by the user authentication. (3) When the client IF unit 602 of the intermediary apparatus 600 receives this request, the repository IF unit 604 logs in, with the cloud ID of the user 500, to the cloud repository service 300 which has been set in advance, and obtains a list of documents that the user 500 has the right to print from among documents saved in the cloud repository service 300. (4) The obtained document list is provided from the client IF unit 602 to the image forming apparatus 110. (5) The image forming apparatus 110 displays the document list on the UI screen, and accepts at least one document selected by the user 500 to be printed. (6) Upon acceptance of the selected document(s), the image forming apparatus 110 sends an instruction to print the selected document(s) to the intermediary apparatus 600. (7) In the intermediary apparatus 600 which has received the print instruction, the repository IF unit 604 obtains the entity data of the selected document(s) from the cloud repository service 300.

(8) The logical printer setting unit 612 in the intermediary apparatus 600 generates a print ticket including an element that indicates the in-house ID ("user name") of the user 500, which has been obtained in the above step (2). Alternatively, for example, at the time at which at least one document is selected to be printed in the above-described (5), an input of print settings from the user 500 may be accepted, the print settings may be sent, together with the print instruction in the above-described (6), to the intermediary apparatus 600, and the logical printer setting unit 612 may incorporate information of the print settings in the print ticket.

(9) An instruction to generate a logical printer 210 with which the print ticket is associated is sent to the cloud print service 200. Accordingly, a logical printer 210 for this printing for the user 500 is generated in the cloud print service 200. The print ticket is set in the logical printer 210. The logical printer setting unit 612 sets, as a user who uses the generated logical printer 210, the cloud ID of the user 500 in the logical printer 210. (10) When the logical printer 210 is generated, the print instruction processing unit 614 of the intermediary apparatus 600 sends, to the logical printer 210, a print instruction including each piece of document data obtained in the above-described (7) as data to be printed.

(11) Upon receipt of the print instruction, the logical printer 210 converts, for each document to be printed, the document data into print data that the image forming apparatus 110 is capable of handling, and adds the print ticket set in the logical printer 210 to the print data, thereby generating an outputtable document.

(12) When the outputtable document to be printed is generated, the print instruction processing unit 614 of the intermediary apparatus 600 obtains the outputtable document (or the cloud print service 200 transfers the generated outputtable document to the intermediary apparatus 600). This obtaining (or transfer) is repeated the number of documents selected to be printed. (13) Upon completion of the obtaining of outputtable documents for all the documents, the logical printer setting unit 612 of the intermediary apparatus 600 gives an instruction to the cloud print service 200 to delete the logical printer 210 generated in the above-described (9).

(14) Every time the client IF unit 602 of the intermediary apparatus 600 obtains an outputtable document in the above-described (12), the client IF unit 602 provides the outputtable document to the image forming apparatus 110. When the intermediary apparatus 600 is outside the in-house network 100, the outputtable document is provided as follows. For example, a message that the outputtable document has been prepared is sent to the image forming apparatus 110 by using a protocol that goes through the firewall of the in-house network 100. In response to the message, the image forming apparatus 110 requests the intermediary apparatus 600 for the outputtable document by using HTTP or the like and obtains the outputtable document. (15) When the outputtable document is obtained, the image forming apparatus 110 prints the outputtable document. The image forming apparatus 110 extracts the in-house ID from the print ticket in the outputtable document, incorporates the in-house ID in log information of the printing, and records the log information.

In the above example, the intermediary apparatus 600 provides the outputtable document, which has been obtained from the cloud print service 200, to the image forming apparatus 110 without changing the outputtable document. This mechanism works only when the image forming apparatus 110 conforms to a print schema such as the print ticket included in the outputtable document. In conceivable cases, the image forming apparatus 110 may not conform to the print schema because, for example, the image forming apparatus 110 is of an old type. In such a case, the intermediary apparatus 600 may convert the outputtable document (particularly the print ticket included therein) into a format to which the image forming apparatus 110 in the in-house network 100 conforms, and provide the converted outputtable document to the image forming apparatus 110.

As above, the example of the system including the intermediary apparatus 600 has been described. In the above example, upon completion of the obtaining of the outputtable document(s) for all the document(s) selected by the user 500, the intermediary apparatus 600 deletes the logical printer 210. However, this is only an example. For example, after the user 500 selects at least one document to be printed and gives a print instruction, the user 500 may continuously select another document(s) to be printed and give the next print instruction. In such a case, if the logical printer 210 is deleted every time the obtaining of the to-be-printed document(s) in each print instruction is completed, the logical printer 210 is generated again for the next print instruction. To avoid such inconvenience, as in the above-described exemplary embodiment, the intermediary apparatus 600 may delete the logical printer 210 in response to detection that the user 500 no longer uses the image forming apparatus 110 as explicit authentication cancellation or timeout.

In this modification, with the intermediary apparatus 600 as above being provided, log information including the in-house ID is recorded for printing using the cloud print service 200 without adding particular changes to the existing image forming apparatus 110 (if there is any change, the item "printing using cloud" in an operation menu is associated with the URL of the intermediary apparatus 600 and is stored).

Since the intermediary apparatus 600 is aware of the number of document(s) requested by the image forming apparatus 110 to be printed in the above-described (6), the intermediary apparatus 600 may recognize completion of the obtaining (or print output) of that number of outputtable document(s) from the cloud print service 200, and, upon the completion, give an instruction to the cloud print service 200 to delete the logical printer 210.

In the above-described exemplary embodiment in which the image forming apparatus 110 performs management for printing using a cloud, there may be occasions in which a print instruction for the cloud repository service 300 is sent as an HTTP request from a Web browser of the UI unit 112. In such occasions, the Web browser is only sending HTTP requests; the Web browser does not analyze the number of document(s) specified to be printed in each request. Unlike the intermediary apparatus 600, the image forming apparatus 110 may not be able to determine whether all the pieces of selected document data have been obtained from the cloud print service 200. In such a case, a print instruction for documents selected at one time may be handled by the method of deleting the logical printer 210 upon detection that the user 500 no longer uses the image forming apparatus 110. Alternatively, such a case may be handled by including the functions of the intermediary apparatus 600 in the image forming apparatus 110.

The exemplary embodiment and the modification described above are examples in the case where the user IDs for the cloud print service 200 and the cloud repository service 300 are the same. However, the mechanisms in the exemplary embodiment and the modification are applicable to other cases. In such cases, for example, the user ID for the cloud repository service 300 may be input by a user or may be read from an IC card. Alternatively, a directory service in the in-house network 100 may be searched for the user ID for the cloud repository service 300 which corresponds to the authenticated in-house ID.

In the foregoing, when a user performs printing using a cloud, a logical printer 210 for the user is "generated", and that logical printer is "deleted" upon finishing the printing. However, this is only an example. Instead, with the cloud ID of the administrator of the in-house network 100 or the cloud ID of the image forming apparatus 110, a logical printer 210 associated with the image forming apparatus 110 may be generated in the cloud print service 200. When performing printing using a cloud, each user may use that logical printer 210 as the user's logical printer 210. In this case, the logical printer setting unit 126 or 612 sends setting information (such as a print ticket) including, as an element, the in-house ID of the user authenticated by the image forming apparatus 110 to the cloud print service 200, thereby updating the setting information in the logical printer 210 associated with the image forming apparatus 110. With this updating process, the logical printer 210 has the setting information including the in-house ID of that user. When that logical printer 210 is used, the print ticket including the in-house ID of that user is transferred, together with print data, to the image forming apparatus 110. Also in this example, when the user has finished using the logical printer 210 (such as when the image forming apparatus 110 completes obtaining of an outputtable document(s) or when the authentication of the user in the image forming apparatus 110 is cancelled), the setting information is updated so that at least the in-house ID is deleted from the setting information in the logical printer 210. In this updating process, the cloud ID of that user may be deleted from the settings of a person (sharer) who has the right to use the logical printer 210. With such processing, even if the logical printer 210 is used by a different person after the use by the former user, the processing log of the use by the different person will not be recorded under the name of the former user.

The information processing function parts (parts that execute a function module group other than the image forming unit 120 in the example illustrated in FIG. 2) of the image forming apparatus 110, and the intermediary apparatus 600, which are described above by way of example, are realized by running, for example, on a general computer, a program that represents processing of the individual function modules of the image forming apparatus 110 and the intermediary apparatus 600. Here, the computer has a circuit configuration in which, as hardware, a microprocessor such as a central processing unit (CPU), memories (main storages) such as a random-access memory (RAM) and a read-only memory (ROM), a hard disk drive (HDD) controller that controls an HDD, various input/output (I/O) interfaces, a network interface that performs control for connection with a network such as a LAN, and the like are interconnected via, for example, bus. Further, for example, a disk drive for reading and/or writing data from/to portable disk recording media, such as a compact disc (CD) and a digital versatile disc (DVD), via an I/O interface, and a memory reader/writer for reading and/or writing data from/to portable non-volatile recording media in various standards, such as a flash memory, may be connected to the bus. A program in which the contents of the processing of the individual function modules described above by way of example are written is saved in a fixed storage such as an HDD via a recording medium such as a CD or a DVD or via a communication tool such as a network, and the program is installed in the computer. The program stored in the fixed storage is read to the RAM and executed by the microprocessor such as the CPU, thereby realizing the function module group described above by way of example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a setting unit configured to obtain first identification information that identifies a user in an information system that performs first authentication, the first identification information being input by the user for user authentication to an image forming apparatus connected to the information system,
   wherein the setting unit is configured to send setting information including the obtained first identification information to a print service system that performs second authentication, thereby establishing a logical printer in which the setting information is set in the print service system, and sets, as identification information of the user who uses the logical printer, second identification information that identifies the user in the print service system; and
   an identification information extracting unit configured to receive, from the print service system, print data to be printed by the image forming apparatus,
   wherein the identification information extracting unit is configured to extract the first identification information from the received print data and to output the extracted first identification information.

2. The information processing system according to claim 1, further comprising a deletion instruction sending unit configured to send, to the print service system, a deletion instruction for deleting the first identification information included in the setting information set, by the setting unit, in the logical printer, upon completion of the receiving, from the print service system, of the print data to be printed by the image forming apparatus.

3. The information processing system according to claim 2, wherein the deletion instruction sending unit is configured to send the deletion instruction to the print service system in response to cancellation of the user authentication of the user in the image forming apparatus.

4. The information processing system according to claim 3, wherein the setting unit is configured to send, to the print service system, a generation instruction to newly generate the logical printer in which the setting information is set in order to establish the logical printer in which the setting information is set in the print service system, and
   wherein the deletion instruction sent by the deletion instruction sending unit is an instruction to delete the logical printer in which the setting information including the first identification information is set.

5. The information processing system according to claim 2, wherein the setting unit is configured to send, to the print service system, a generation instruction to newly generate the logical printer in which the setting information is set in order to establish the logical printer in which the setting information is set in the print service system, and wherein the deletion instruction sent by the deletion instruction sending unit is an instruction to delete the logical printer in which the setting information including the first identification information is set.

6. The information processing system according to claim 1, further comprising:
a job management unit;
a log recording processing unit; and
a log storage unit,
wherein the log recording processing unit is configured to store, in the log storage unit, log information of each print job executed by the job management unit,
wherein the log recording processing unit is configured to provide, using the stored log information, aggregation information regarding a usage amount of the image forming apparatus by each user of the information system.

7. The information processing system according to claim 1, wherein the first identification information comprises an in-house ID.

8. An image forming apparatus comprising:
a setting unit configured to obtain first identification information that identifies a user in an information system that performs first authentication, the first identification information being input by the user for user authentication to the image forming apparatus, which is connected to the information system,
wherein the setting unit is configured to send setting information including the obtained first identification information to a print service system that performs second authentication, thereby establishing a logical printer in which the setting information is set in the print service system, and sets, as identification information of the user who uses the logical printer, second identification information that identifies the user in the print service system; and
an identification information extracting unit configured to receive, from the print service system, print data to be printed by the image forming apparatus,
wherein the identification information extracting unit is configured to extract the first identification information from the received print data and to output the extracted first identification information.

9. An information processing system comprising:
a setting unit that obtains first identification information that is identification information of a user in an information system that performs first authentication, the identification information being input by the user for user authentication to an image forming apparatus connected to the information system, sends setting information including the obtained first identification information to a print service system that performs second authentication, thereby establishing a logical printer in which the setting information is set in the print service system, and sets, as identification information of a person who uses the logical printer, second identification information that is identification information of the user in the print service system; and
an identification information extracting unit that receives, from the print service system, print data to be printed by the image forming apparatus, and extracts and outputs the first identification information set in the received print data,
wherein the information processing system further comprises a deletion instruction sending unit that sends, to the print service system, a deletion instruction for deleting the first identification information included in the setting information set, by the setting unit, in the logical printer, upon completion of the receiving, from the print service system, of the print data to be printed by the image forming apparatus.

10. The information processing system according to claim 9, wherein the deletion instruction sending unit sends the deletion instruction to the print service system in response to cancellation of the user authentication of the user in the image forming apparatus.

11. The information processing system according to claim 10, wherein
the setting unit sends, to the print service system, a generation instruction to newly generate the logical printer in which the setting information is set in order to establish the logical printer in which the setting information is set in the print service system, and
the deletion instruction sent by the deletion instruction sending unit is an instruction to delete the logical printer in which the setting information including the first identification information is set.

12. The information processing system according to claim 9, wherein
the setting unit sends, to the print service system, a generation instruction to newly generate the logical printer in which the setting information is set in order to establish the logical printer in which the setting information is set in the print service system, and
the deletion instruction sent by the deletion instruction sending unit is an instruction to delete the logical printer in which the setting information including the first identification information is set.

* * * * *